US008141461B1

(12) United States Patent
Chandler

(10) Patent No.: US 8,141,461 B1

(45) Date of Patent: Mar. 27, 2012

(54) METHOD AND APPARATUS FOR REMOTELY MANIPULATING THREADED COMPONENTS

(76) Inventor: James W. Chandler, Johnstown, OH (US)

( * ) Notice: Subject to any disclaimer, the term of this patent is extended or adjusted under 35 U.S.C. 154(b) by 452 days.

(21) Appl. No.: 12/398,017

(22) Filed: Mar. 4, 2009

(51) Int. Cl.
*B25B 13/06* (2006.01)
*B23P 19/00* (2006.01)

(52) U.S. Cl. ...................................... 81/121.1; 29/426.5

(58) Field of Classification Search ................. 81/121.1, 81/119, 177.2, 125, 176.15, 124.4, 124.5, 81/124.6, DIG. 8; 7/138; D8/26-29
See application file for complete search history.

(56) References Cited

U.S. PATENT DOCUMENTS 174,486 A * 3/1876 Collingsworth ............. 81/124.4
444,571 A * 1/1891 Smith .......................... 81/124.4
986,112 A 3/1911 Wood
1,512,559 A * 10/1924 Moore ............................ 81/119
1,759,221 A * 5/1930 Carson .......................... 137/364
1,796,083 A * 3/1931 Carlberg ........................... 7/138
2,178,298 A 10/1939 Bowan
2,247,426 A 7/1941 Wilson
3,773,067 A * 11/1973 Ray ............................... 137/318
4,016,783 A 4/1977 Spector et al.
4,310,015 A 1/1982 Stewart et al.
4,546,679 A * 10/1985 Burghardt ........................ 81/119
4,546,789 A 10/1985 Taylor
4,869,281 A 9/1989 Rockower et al.
5,638,590 A * 6/1997 Silano ............................. 29/254
6,272,952 B1 * 8/2001 Hsu et al. .......................... 7/138
6,609,445 B2 8/2003 Elmore
6,871,401 B1 3/2005 Blankenship
7,000,897 B2 * 2/2006 Chick ........................... 251/293
7,343,936 B2 3/2008 Collins et al.
2006/0081094 A1 * 4/2006 Ludwig et al. ............... 81/124.2

OTHER PUBLICATIONS

Web page entitled "Valve & Curb Keys," pp. 1-2, Mar. 4, 2009 (http://www.reedmfgco.com/index.html?screen=valve_curb_keys).
Untitled web page, p. 1,Mar. 4, 2009 (http://www.waterkey.com/images/v2/curbKey1.jpg).
Web page entitled "Toolmonber >> Blog Archive >> Right-Angle pipe Wrench," pp. 1-2, Mar. 4, 2009 (http://www.toolmonger.com/2008/08/05/right-angle-pipe-wrench/).
City of Columbus, "Water Service Handbook 2004 Edition," pp. 1-51, 2004.

* cited by examiner

*Primary Examiner* — Hadi Shakeri
(74) *Attorney, Agent, or Firm* — Lech Law, LLC; Robert R. Lech

(57) ABSTRACT

A wrench is disclosed comprising a shaft and a wrench head. The wrench head is attached to a first end of the shaft. The wrench head comprises at least two opposing jaws substantially perpendicular to the shaft, and a socket substantially parallel to the shaft. A water main distribution testing system and methods for remotely manipulating threaded components are also disclosed.

4 Claims, 7 Drawing Sheets

METHOD AND APPARATUS FOR REMOTELY MANIPULATING THREADED COMPONENTS

BACKGROUND

The installation and testing of public water distribution systems are typically regulated by federal, state and local governments. Water distribution systems usually include relatively large distribution lines or pipes called water mains. The regulations governing the installation and repair of water distribution systems often mandate connections, or service taps, to be installed in the water mains at certain intervals to enable, among other things, chlorination of the system prior to service, water pressure testing prior to service, and access to the system during service.

Connections to a water main for service lines 2 inches or smaller are called corporation stops. Such connections are typically made using approved hardware, such as a Mueller H-15000, for example. Many such connections are intended to be temporary, and these temporary connections are known as blow-offs. Blow-offs may be used for testing purposes and may be removed after testing of the system is complete and prior to placing a water main into service.

Prior to putting a water main into service, regulations often dictate that the water main be sanitized or disinfected with chlorine or another disinfectant. Chlorine is inserted into the system via a first blow-off and flushed through the water main with water. A portion of the water may be removed at a downstream blow-off, and the water may be tested for contaminants.

Another test typically which may be performed, prior to putting a water main into service, is a water pressure test. Water is forced through the system at a known water pressure, and gauges may be installed at various downstream corporation stops to test the water pressure at different locations throughout the system.

During installation of the system, the water mains and corporation stops are typically laid out in large trenches. Upon installation, the trenches may be filled in with earth, thereby burying the water distribution system beneath the surface of the ground. Prior to burial, temporary access lines are connected to the temporary corporation stops. These access lines are designed to provide a connection to the system just above the surface of the ground for testing.

According to prior art systems and methods for installing water and other distribution systems, once testing is complete, the earth around the temporary connections is removed; the temporary access lines are disconnected; the corporation stops are removed; and the temporary connection points are permanently plugged. The voids created to access the temporary connections are then refilled with earth.

SUMMARY

According to a first aspect of the present application, a wrench is disclosed. The wrench comprises a shaft and a wrench head. The wrench head is attached to a first end of the shaft. The wrench head comprises at least two opposing jaws substantially perpendicular to the shaft; and a socket substantially parallel to the shaft.

According to a second aspect of the present application, a method for remotely extracting a threaded component is disclosed. The method comprises: providing a passage to a threaded component; providing a wrench comprising a shaft and a wrench head having at least two opposing jaws substantially perpendicular to the shaft and a socket substantially parallel to the shaft; inserting the wrench into the passage; engaging the threaded component with the wrenching head; applying a force to the wrench; and extracting the threaded component.

BRIEF DESCRIPTION OF THE DRAWINGS

The accompanying figures, which are incorporated in and constitute a part of the specification, illustrate various example apparatuses, systems, methods, and so on, and are used merely to illustrate various example embodiments. It should be noted that various components depicted in the figures may not be drawn to scale, and that the various assemblies and designs depicted in the figures are presented for purposes of illustration only, and should not be considered in any way as limiting.

DETAILED DESCRIPTION

The present application describes systems, methods and apparatus for remotely manipulating threaded components. Such systems, methods and apparatus may be used during the installation, testing and maintenance of water distribution systems, natural gas distribution systems, and the like.

Certain activities that typically occur during installation of distribution systems, including for example initial burial of the water main, earth removal to access a corporation stop following testing, removal of the corporation stop, plugging of the tapped bore, and reburial of the water main, are costly, inefficient and dangerous. In the case of a natural gas distribution system, for example, the close proximity of workmen to the pipes coupled with the limited access to oxygen can be life-threatening.

The activities may involve three (3) or more men each working one (1) hour or more. The activities further may utilize significant materials, tools and other resources. Consequently, there is a need for more cost-effective, efficient and safe systems and methods for installing and removing temporary corporation stops and the like.

Figure 1A:
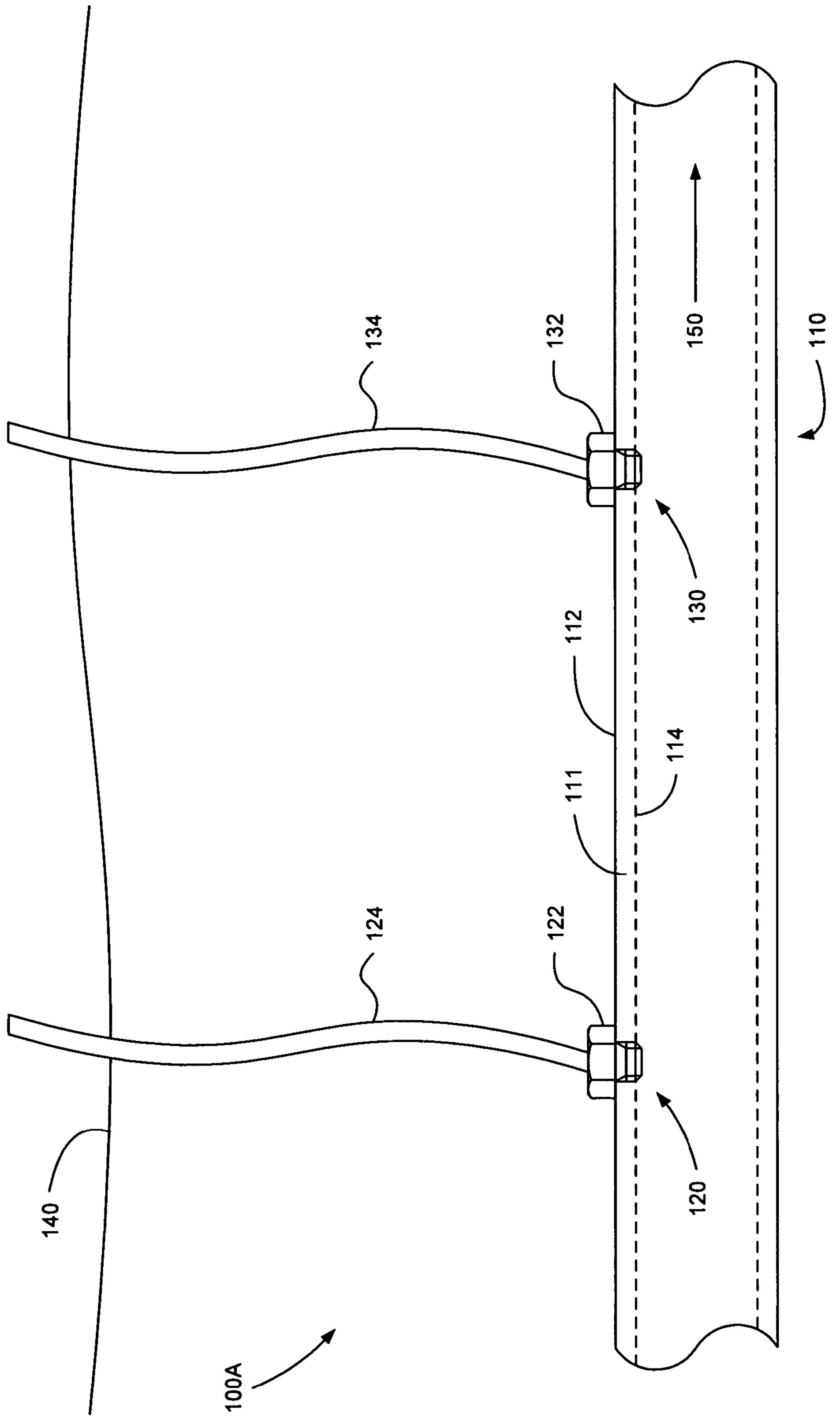
FIGS. 1A-1C illustrate various example water main distribution testing system environments.

FIG. 1A illustrates an example water main distribution testing system environment 100A. Environment 100A represents a water main distribution system which has been partially installed but not fully tested.

A portion of a buried water main 110 is illustrated. Water main 110 comprises wall 111 having an outer wall surface 112 and an inner wall surface 114. The illustrated water main portion 110 includes two threaded taps 120 and 130 through wall 111. Each threaded tap 120 and 130 engages a corporation stop 122 and 132, respectively. Although not shown in the Figures, the corporation stops may comprise a valve mechanism for controlling the flow of water through the corporation stops.

As shown, access lines 124 and 134 are connected to corporation stops 122 and 132, respectively. All of the components of the illustrated water main distribution system are buried beneath the surface of the earth 140, except for a portion of access lines 124 and 134. Exposed portions of access lines 124 and 134 enable personnel to easily access the water main distribution system to conduct tests.

One example test that may be performed prior to approving the water main for service is a water pressure test. In a water pressure test, water is forced through the water main, in a direction indicated by reference numeral 150, at a predetermined water pressure. Pressure gauges are installed at various downstream points along the water main, such as at corporation stops 122 and 132. The water pressure is measured at the various downstream points to determine whether the water main system is performing to specification.

A second example test that may be performed prior to approving the water main for service is a chlorination test. In a chlorination test, water containing chlorine or another disinfectant is forced through the water main. Water samples may be taken at downstream points along the water main to determine a level of water contamination. The level of monitored contamination is compared to a predetermine threshold to determine whether the water main system is performing to specification.

Figure 1B:
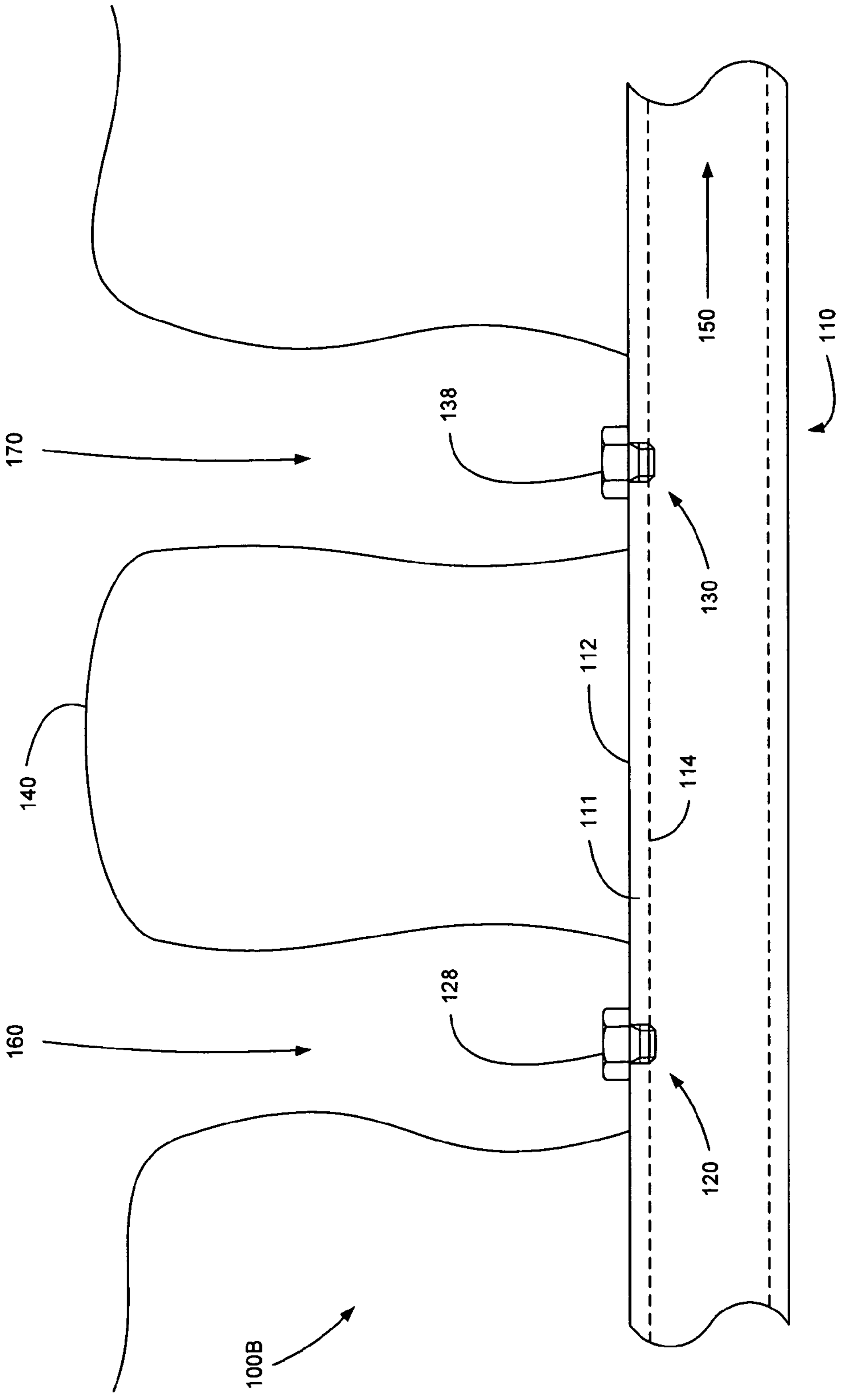

FIG. 1B illustrates an example water distribution system 100B after testing is complete. As illustrated in FIG. 1B, once testing of the water main distribution system is complete, the earth covering corporation stops 122 and 132 (shown in FIG. 1A) is removed to create voids 160 and 170 allowing direct access to the corporation stops. Access lines 124 and 134 are disconnected and removed, and threaded plugs 128 and 138 are installed into threaded bores 120 and 130, respectively. Voids 160 and 170 are then typically refilled with earth. In such a configuration, the water main distribution system may be placed into service.

Figure 1C:
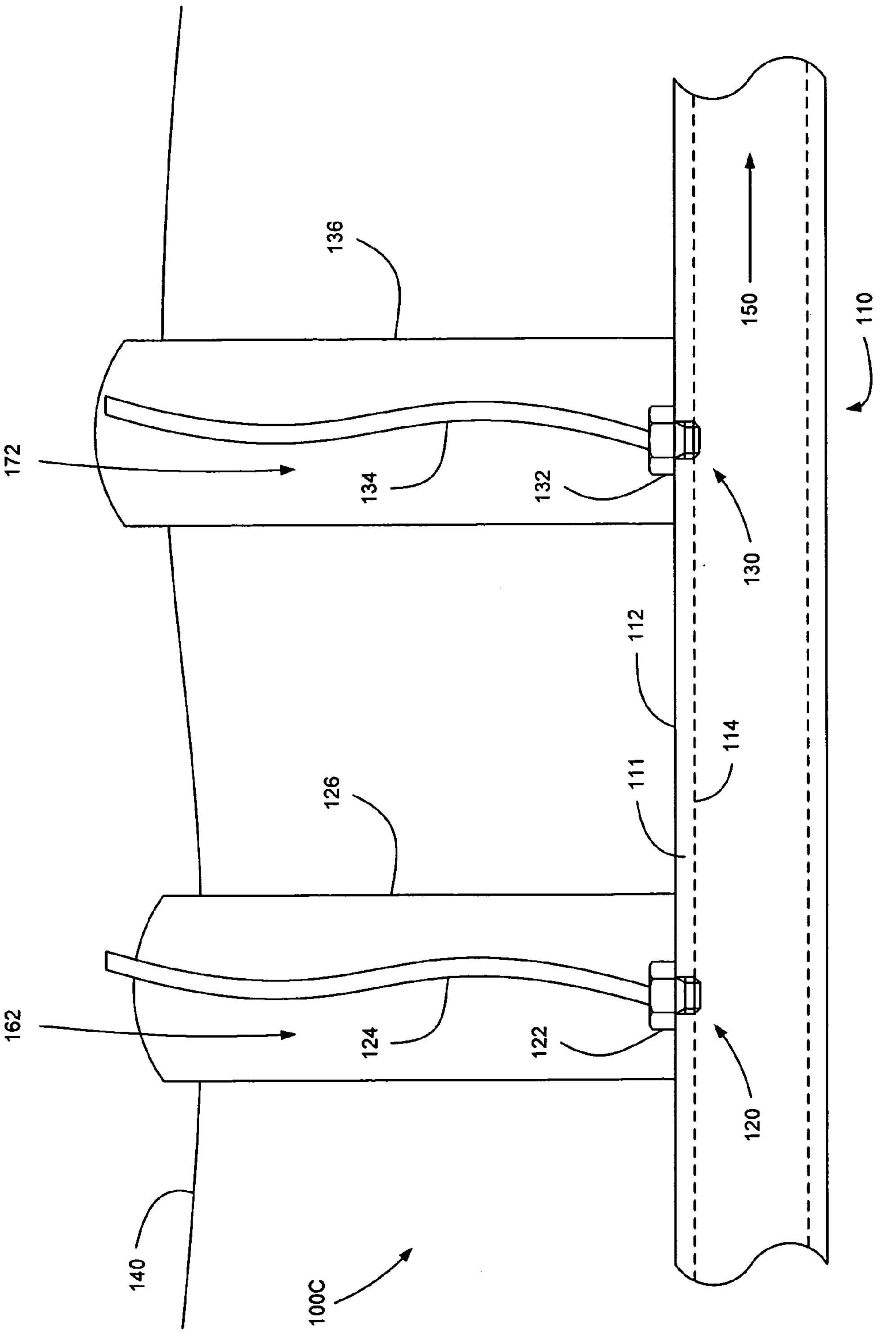

FIG. 1*c* illustrates an example water main distribution testing system environment 100C which reduces the inefficiency of unburying, plugging and reburying temporary corporation stops upon completing testing. According to one aspect of the present application, tubes 126 and 136 are installed prior to burial of the water main 110. Tubes 126 and 136 form passages 162 and 172, respectively providing continued access to corporation stops 122 and 132 during and after testing.

Use of testing environment 100C reduces the inefficiencies, costs and dangers associated with burying corporation stops and later removing the ground above a corporation stop for testing, access line removal and plugging. Although tubes 126 and 136 provide access to respective corporation stops 122 and 132, access may be limited due to the width of the tubes. An example wrench 200, described in greater detail with reference to FIG. 2, facilitates activities typically related to post testing procedures associated with corporation stops, such as access line removal and plug insertion, for example.

According to the example system 100C, when testing the water main 110 is completed, access lines 124 and 134 may be removed using a wrench 200. Wrench 200 may also be used to plug threaded bores 120 and 130. Tubes 126 and 136 may then be filled with earth or gravel to complete the burial of the system, thereby more efficiently installing the water distribution system. Further, because tubes 126 and 136 are left in place after installation, threaded bores 120 and 130 may be accessed for maintenance or other purposes at a later date by excavating the ground or other material within the tubes and using wrench 200.

Figure 2:
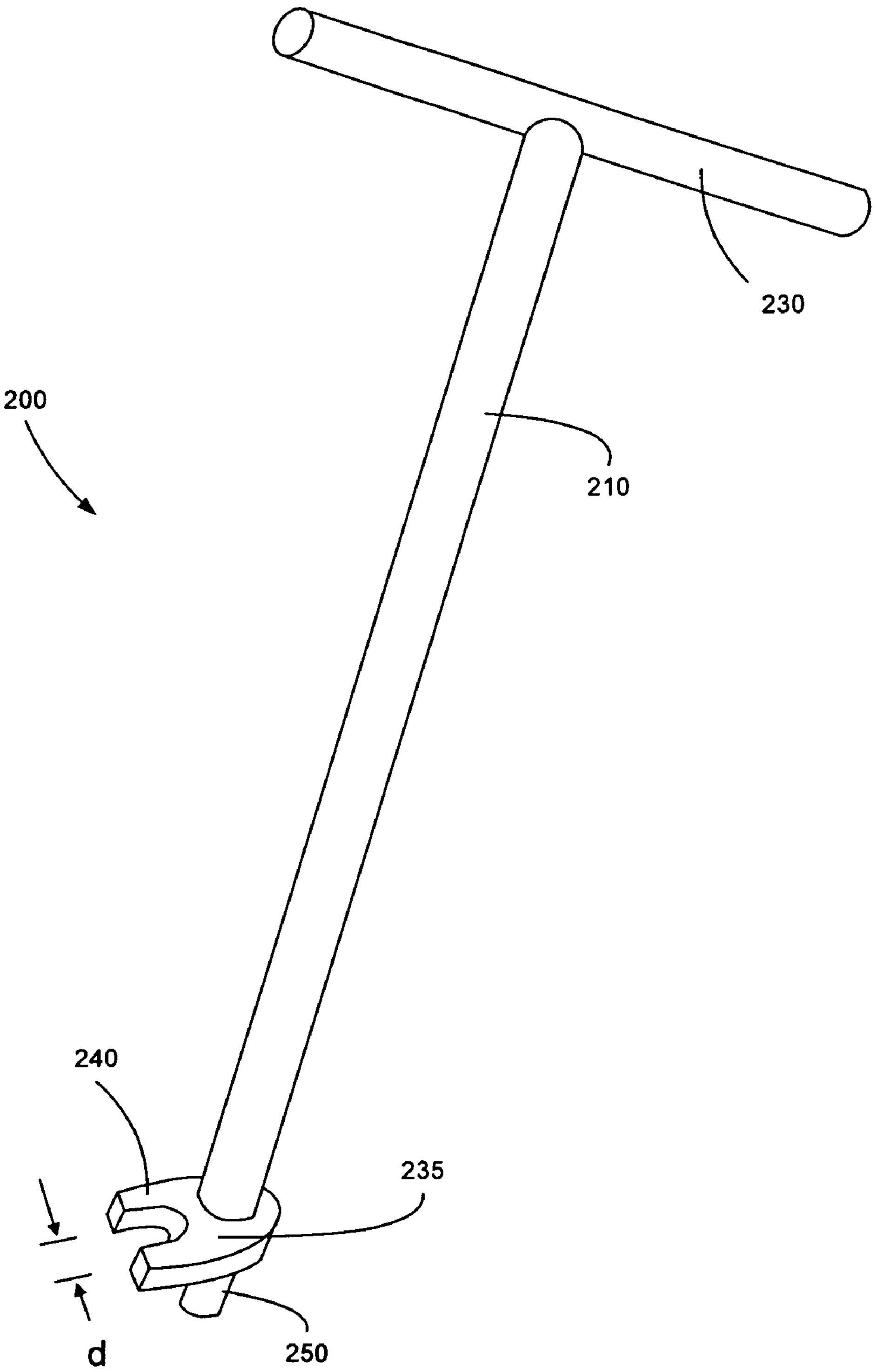
FIG. 2 illustrates an example embodiment of a wrench.

FIG. 2 illustrates the example wrench 200 which may be used to remotely manipulate threaded components, such as a corporation stop and a plug. Example wrench 200 comprises a shaft 210, a wrench head 235, and a handle 230.

As illustrated, shaft 210 may be a fixed length shaft. In an alternate embodiment, shaft 210 may be extensible to accommodate various lengths. For example shaft 210 may be a telescoping shaft.

The wrench head 235, disposed at a first end of shaft 210, comprises at least two opposing jaws 240 substantially perpendicular to the shaft 210 thereby forming an open-ended wrench. Opposing jaws 240 are illustrated in a fixed configuration, spaced apart by a distance (d) between the opposing jaws 240. Of course one of ordinary skill will recognize that opposing jaws 240 may be either fixed, as shown, or adjustable.

Wrench head 235 further comprises a socket 250 generally disposed along the central axis of shaft 210. Socket 250 may be permanently or removably attached to wrench head 235. Embodiments in which socket 250 may be removably attached to wrench head 235 allow sockets to be interchanged, thereby enabling engagement with and manipulation of threaded components of various sizes. In an alternate embodiment, socket 250 may be adjustable, thereby enabling engagement with and manipulation of threaded components of various sizes. The handle 230 disposed at a second end of wrench 200 enables a user to remotely apply rotational or torsional force to the wrench head 235.

Figure 3:
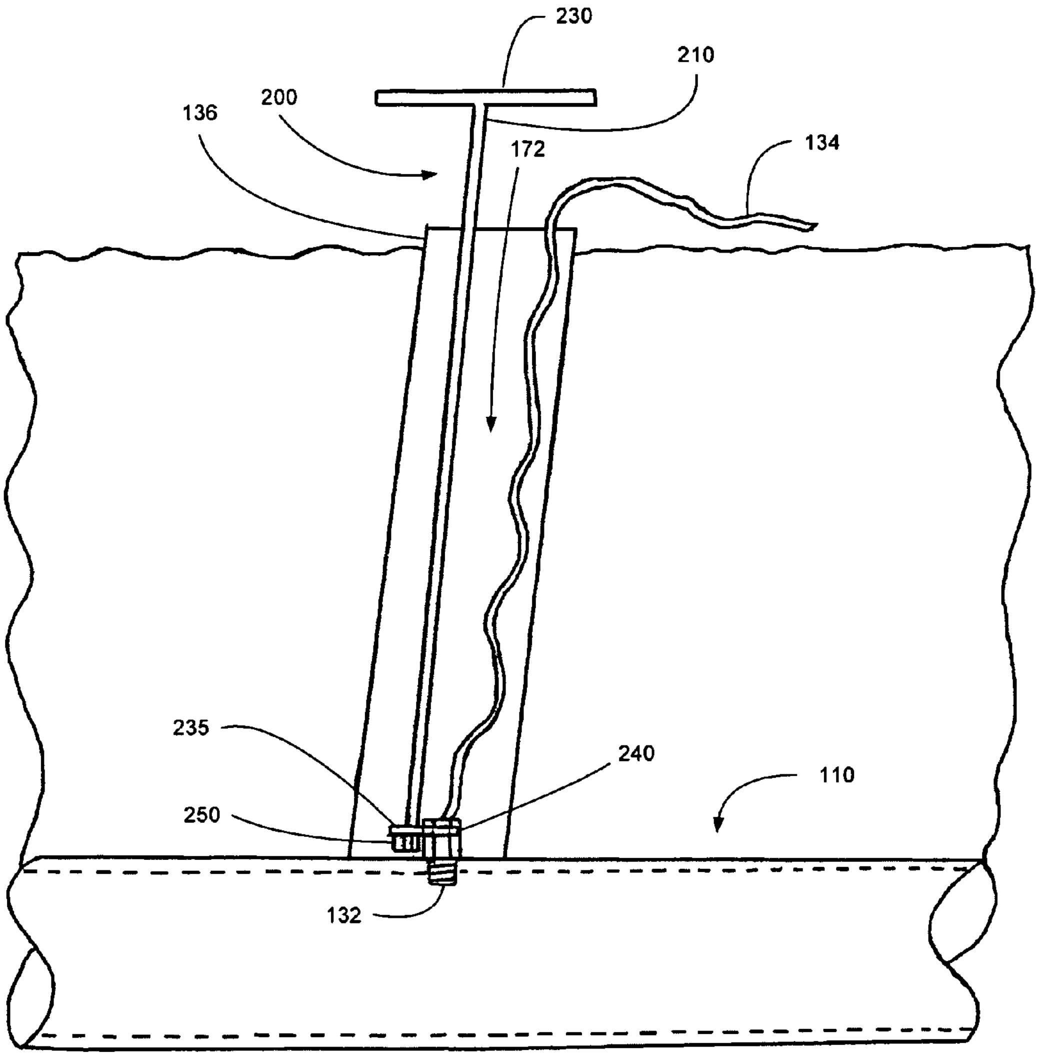
FIG. 3 illustrates a first example use of wrench 200.

FIG. 3 illustrates a first example use of wrench 200 with respect to testing environment 100C. Of course, wrench 200 may also be useful with respect to testing environments 100A and 100B and other environments. The illustrated first example use of wrench 200 may be useful in removing corporation stop 132 upon completion of any testing of a water main distribution system. Of course, the first example use of wrench 200 may also be useful for tightening or otherwise adjusting corporation stop 132.

According to the first use, wrench 200 is lowered into tube 136 such that shaft 210 is generally axially aligned with tube 136. Wrench head 235 is disposed in proximity to corporation stop 132. Wrench head 235 is further disposed such that opposing jaws 240 of wrench head 235 engage and cooperate with corporation stop 132.

Torque may be applied to wrench handle 230 causing corporation stop 132 to be rotated either clockwise or counterclockwise with respect to the axis of the wrench 200. Such torque, in turn causes corporation stop 132 to rotate within the threaded tap 130 in water main 110. Rotating corporation stop 132 causes the corporation stop 132 to move into or out of water main 110.

Once corporation stop 132 has been rotated sufficiently to cause the corporation stop 132 to disengage from the threaded tap 130 in water main 110, corporation stop 132 may be removed from passage 172. For example, corporation stop 132 may be removed by upwardly pulling on access line 134.

Figure 4:
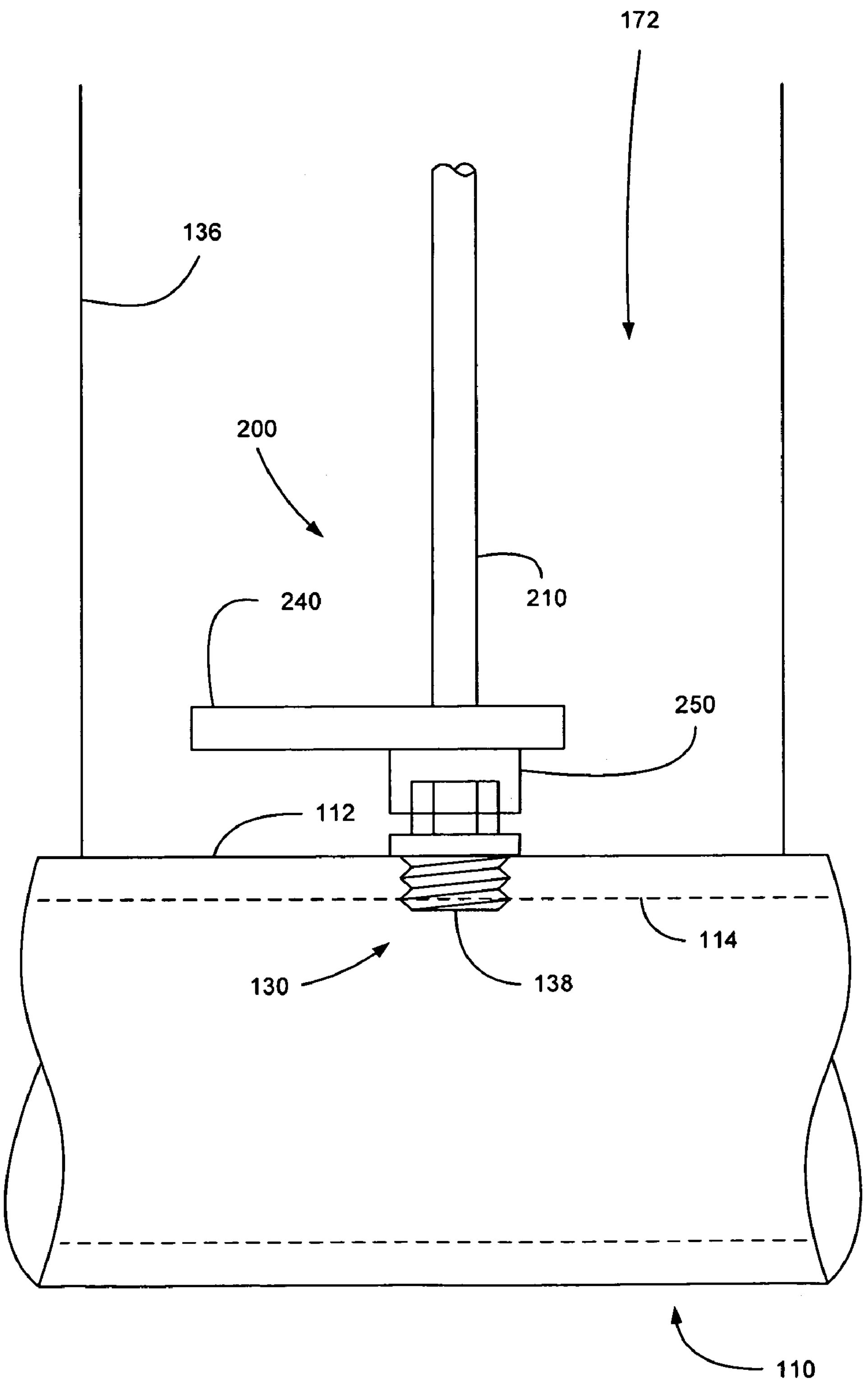
FIG. 4 illustrates a second example use of wrench 200.

FIG. 4 illustrates a second example use of wrench 200 with respect to testing environment 100C shown in FIG. 1C. The second example use of wrench 200 may be useful for inserting a plug, such as example plug 138, into a threaded tap of water main 110, such as threaded tap 130. Tap 130 may be plugged with plug 138 upon removal of corporation stop 132 following the completion of testing of the water main distribution system illustrated in FIG. 1C. Of course, the second example use of wrench 200 may also be useful for tightening or otherwise adjusting a plug such as plug 138.

Figure 5B:
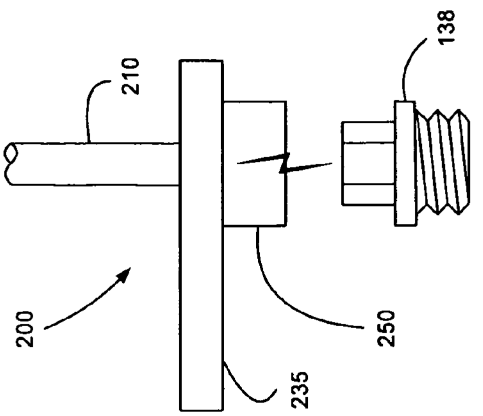
FIGS. 5A-5C illustrate various example embodiments of plug retention mechanisms.
Figure 5C:
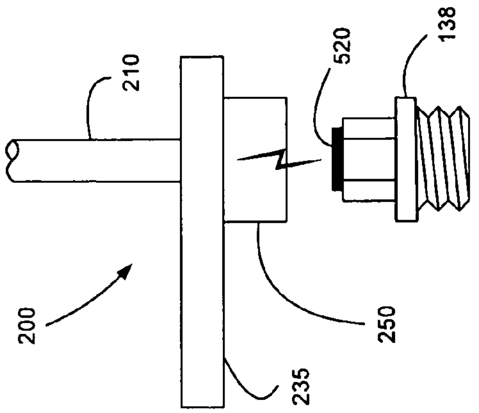
Figure 5A:
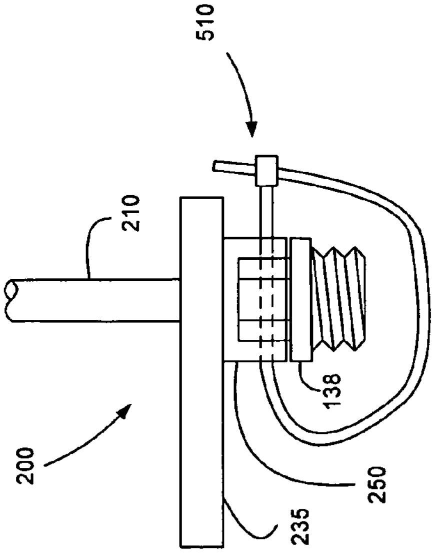

Prior to inserting wrench 200 into tube 136, plug 138 may be inserted into socket 250. To prevent plug 138 from disengaging with socket 250, plug 138 may be temporarily affixed to socket 250 in a variety of ways. For example, plug 138 may be affixed to socket 250 using a zip-tie 510 or other such fastener threaded through at least one hole in plug 138 and socket 250, as shown in FIG. 5A. In an alternate embodiment, plug 138 may be affixed to socket 250 using magnetism. Either or both of plug 138 and socket 250 may be magnetized, as shown in FIG. 5B, or employ a magnetized element 520 affixed thereto, as shown in FIG. 5C. Of course, one of ordinary skill will appreciate a number of other ways to temporarily affix plug 138 to socket 250. The present application envisions such other ways for temporarily affixing plug 138 to socket 250.

Referring back to FIG. 4, wrench 200 is lowered into tube 136 such that wrench head 235 and plug 138 are disposed in proximity to threaded tap 130. Plug 138 may engage and cooperate with threaded tap 130 by applying torque to wrench handle 230 causing plug 138 to be rotated either clockwise or counter-clockwise so that plug 138 may be either inserted into or removed from threaded tap 130. Once plug 138 has been rotated sufficiently to cause the plug to completely seal the threaded tap 130 in water main 110, wrench 200 may be disengaged from plug 138 and removed from tube 136.

In embodiments in which plug 138 is affixed to socket 250 using zip-tie 510 or similar fastener, the zip-tie 510 may be broken with a requisite amount of force, and the zip-tie 510 may be removed with the wrench 200 or left in tube 136 to be buried.

Unless specifically stated to the contrary, the numerical parameters set forth in the specification are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A method for remotely extracting a first threaded component and installing a second threaded component, the method comprising:
- providing a passage 172 to an inaccessible first threaded component 132;
- providing a wrench 200 comprising:
  - a shaft 210; and
  - a wrenching head 235 having at least two opposing jaws 240 substantially perpendicular to the shaft 210 and a socket 250 substantially parallel to the shaft 210;
- inserting the wrench 200 into the passage 172;
- engaging the first threaded component 132 with the wrenching head 235;
- applying a force to the wrench 200;
- extracting the first threaded component 132;
- engaging a second threaded component 138 with the wrenching head 235;
- applying a force to the wrench 200; and
- installing the second threaded component 138 in the aperture from which the first threaded component 132 was extracted.

2. The method of claim 1, wherein the installing the second threaded component 138 comprises installing a plug.

3. The method of claim 1, wherein the engaging the second threaded component 138 with the wrenching head 235 comprises engaging the second threaded component with the socket 250.

4. The method of claim 3, further comprising activating a threaded component retention device 510.

* * * * *